United States Patent [19]

Raymond

[11] Patent Number: 5,074,495
[45] Date of Patent: Dec. 24, 1991

[54] LOAD-ADAPTIVE HYBRID ACTUATOR SYSTEM AND METHOD FOR ACTUATING CONTROL SURFACES

[75] Inventor: Eugene T. Raymond, Kent, Wash.

[73] Assignee: The Boeing Company, Seattle, Wash.

[21] Appl. No.: 496,069

[22] Filed: Mar. 16, 1990

Related U.S. Application Data

[63] Continuation of Ser. No. 139,284, Dec. 29, 1987, abandoned.

[51] Int. Cl.[5] .............................................. B64C 3/40
[52] U.S. Cl. ...................................... 244/78; 244/226; 60/403; 60/430
[58] Field of Search .............. 244/75 R, 76 R, 78, 244/226, 227; 91/509, 510; 60/403–406, 428–430, 446, 468, 484

[56] References Cited

U.S. PATENT DOCUMENTS

| | | | |
|---|---|---|---|
| 1,996,466 | 4/1935 | Ernst | 60/430 X |
| 3,679,156 | 7/1972 | Redmond, Jr. | 244/78 X |
| 3,794,276 | 2/1974 | Maltby et al. | 244/78 |
| 4,143,583 | 3/1979 | Bauer et al. | 91/509 X |
| 4,472,998 | 9/1984 | Vanderlaan | 91/510 |
| 4,561,250 | 12/1985 | Aoyagi et al. | 60/468 X |
| 4,567,813 | 2/1986 | Garnjost | 91/509 X |
| 4,601,169 | 7/1986 | Hesse et al. | 60/406 |
| 4,671,166 | 6/1987 | Glaze et al. | 244/233 X |
| 4,744,532 | 5/1988 | Ziegler et al. | 244/75 R |
| 4,754,940 | 7/1988 | Deter | 244/75 R |
| 4,773,620 | 9/1988 | Seidel | 244/78 |

FOREIGN PATENT DOCUMENTS

| | | | |
|---|---|---|---|
| 3640082 | 6/1988 | Fed. Rep. of Germany | 244/78 |
| 448694 | 10/1986 | U.S.S.R. | 244/78 |

OTHER PUBLICATIONS

Galy, "Airbus Hydraulic Power Always Available", *Hydraulics & Pneumatics*, Dec. 1972, pp. 57–60.

*Primary Examiner*—Galen L. Barefoot
*Attorney, Agent, or Firm*—Seed and Berry

[57] ABSTRACT

An actuator system for a control surface of an aircraft having a hydraulic system and a source of actuation system commands. The actuator system includes hydraulic circuits connected to the aircraft hydraulic system and an electrically-powered hydraulic circuit integrated with the actuator. The electrically-powered hydraulic circuit includes an electric motor connected to a hydraulic fluid pump. The pump can be controlled to adapt to the power requirements to actuate the control surface.

13 Claims, 3 Drawing Sheets

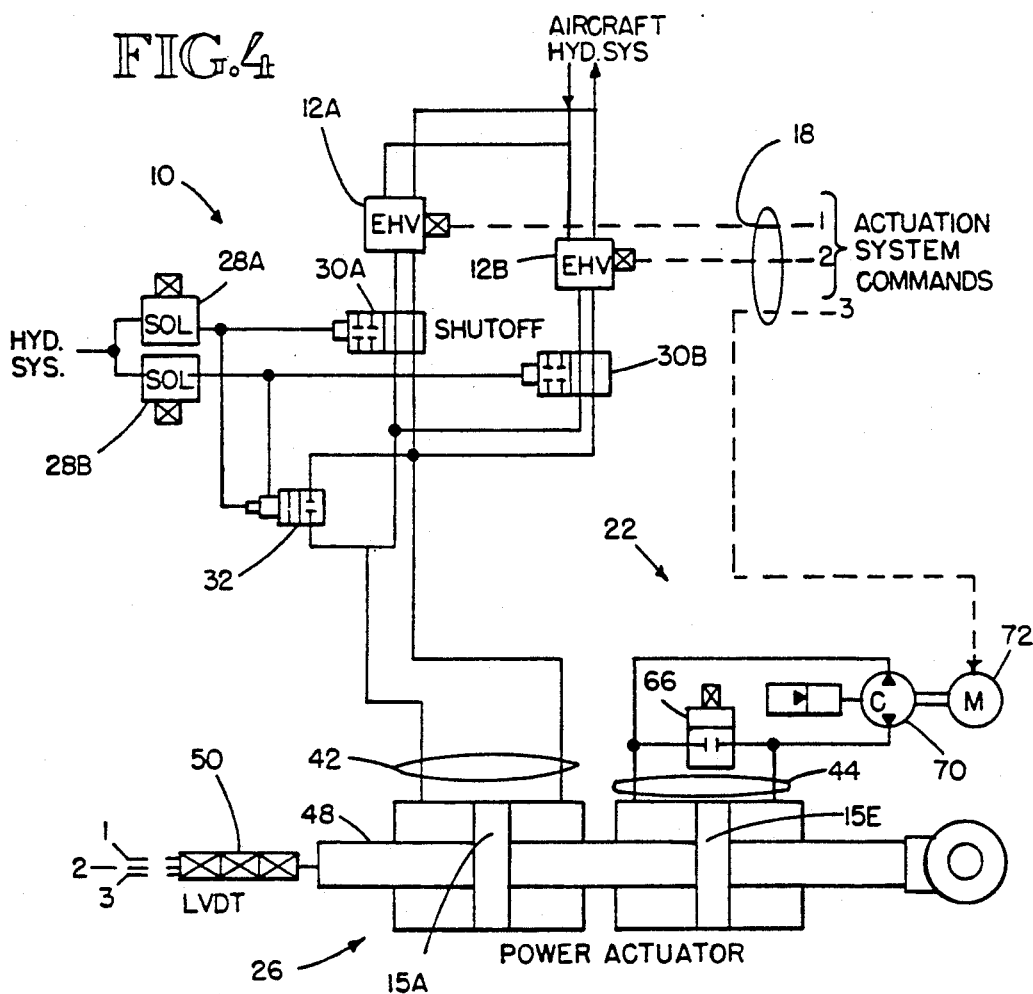
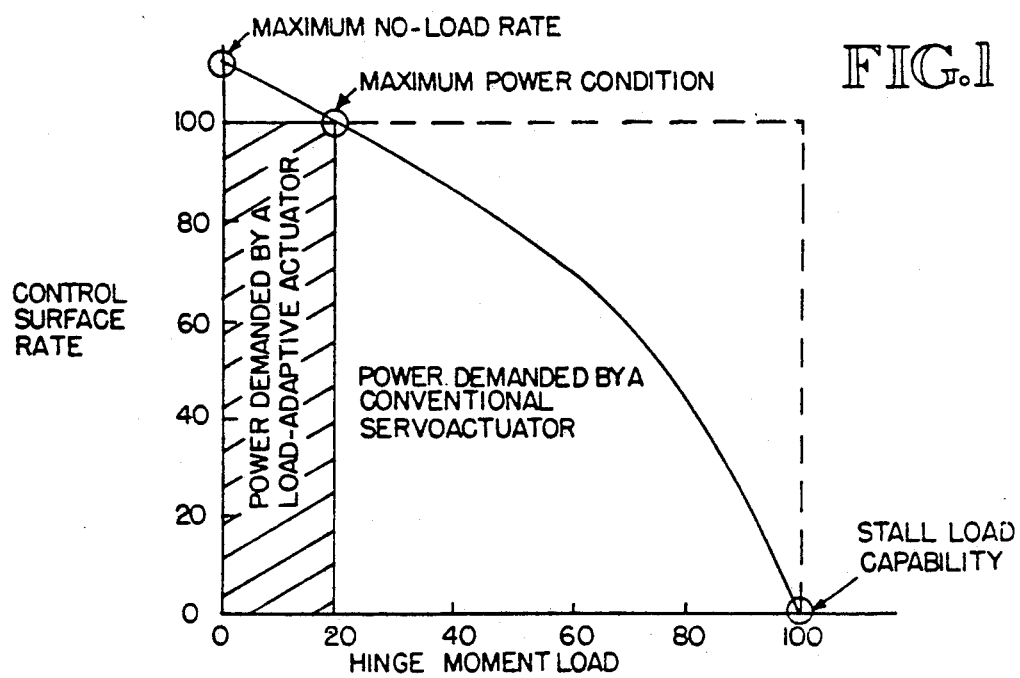

LOAD-ADAPTIVE HYBRID ACTUATOR SYSTEM AND METHOD FOR ACTUATING CONTROL SURFACES

CROSS-REFERENCE TO RELATED APPLICATION

This application is a continuation of U.S. application Ser. No. 07/139,284 filed Dec. 27, 1987, now abandoned.

DESCRIPTION

1. Technical Field

This invention relates to a control-surface actuator system and a method for actuating control surfaces, and more particularly, to a hydraulic control-surface actuator system and method for actuating control surfaces with electrical and hydraulic power supplied from a remote power source, and with control signals transmitted either mechanically or electrically.

2. Background Art

Hydraulic servoactuators are used to control and position many devices on aircraft, surface ships, submarines, land vehicles, machine tools, and other industrial equipment. The actuation systems for positioning flight control surfaces on large and/or fast aircraft require large force outputs to overcome the aerodynamic loads, and accurate positioning with fast response to achieve the desired flight path. Aircraft actuation systems must be highly reliable, since failure of a critical control actuator can either prevent necessary position corrections or throw the surface hard over and, consequently, put the aircraft into an uncontrolled dive. In addition, such actuation systems must be designed to withstand all expected variations in the environments to which they will be exposed. These variations include adverse effects of nature (such as lightning strikes), induced environments (vibration, shock, and noise), onboard failure of other systems and adjacent structures, flight crew errors, and hostile action. A high degree of survivability is required for military aircraft and other aircraft subject to military actions.

Simple integrated hydraulic actuator packages (IAPs) have been used in the past. The IAP concept includes a hydraulic pump driven by an electric motor, a fluid reservoir, and a servoactuator packaged into a single line replaceable unit (LRU) which is located close to the device that is intended to be actuated. Integrated hydraulic actuator packages thus allow hydraulic actuation at relatively remote locations without the need to route hydraulic lines to the actuator since the IAP is electrically powered. The first known use of the IAP principle was in the powered gun turrets used on bomber aircraft in World War II. These turrets used an electrically-driven fixed displacement pump closely coupled to a variable-displacement hydraulic motor. A hydraulic motor, rather than an electric motor, was chosen to drive the output gearing in order to obtain the fast response and accurate positioning needed to keep the guns on target. This principle was expanded in the mid-1950s, by replacing the hydraulic motor with a linear servoactuator.

In large aircraft, transmitting power to the distributed IAPs (gun turrets or servoactuators) electrically rather than hydraulically can reduce weight by eliminating the need for long hydraulic branch lines to those units. More importantly, the electric cabling is less vulnerable to hostile action and other damage than the thin-wall tubing normally used in aircraft hydraulic systems. Experience has shown that, with fully hydraulic flight control actuation systems, relatively minor damage caused by small-arms fire can cause loss of control of an aircraft. This loss of control can be due both to ruptured hydraulic distribution lines that lose their fluid and to severed or jammed flight control linkages.

Several specific IAP types, all with one or more electric-motor-driven pumps, and either mechanical-input or electrohydraulic servovalves have been designed and tested. Two types were produced and used on three production British aircraft. They were "simplex" units with a single motor-driven pump and single actuator. On two of these British aircraft models, a civil airliner and a military bomber, the pilot's control commands were transmitted through control cables to mechanical-input hydraulic servovalves on the IAPs. On the third aircraft model, a military transport, the pilot's commands were transmitted electrically to electrohydraulic servovalves.

In each case, redundancy of the aircraft control modes (pitch, roll, and yaw) was achieved through multiple control surfaces, i.e., two ailerons per wing instead of one, two elevators per each horizontal stabilizer instead of one, and two (in one case, three) rudders on the vertical fin. However, for many aircraft, especially advanced designs, and for many other applications, redundancy of the controlled device is not feasible. Redundancy must be provided in the actuation system to a single control surface or other device.

Each of the British IAPs was a "servopump" type with a constant-speed electric motor driving a pump whose displacement rate and direction of flow were controlled by an electrohydraulic servovalve (EHV). The pump output flow was directed to the hydraulic actuating cylinder in response to control commands so as to move the cylinder piston to the desired position.

The servopump type was selected over a servovalve controlled actuator as a means of minimizing heat generation within the IAP unit which, if allowed to build up faster than is could be dissipated, could raise hydraulic fluid temperatures to an unsafe level. The servopump is a good approach for subsonic aircraft where there is little aerodynamic heating, thus allowing good heat transfer to the cold outer skin and support structure; and, it proved very successful for the three British aircraft models. However, it may not be adequate for some supersonic aircraft both from an overheat standpoint and/or because of insufficient spring-rate stiffness and response rate which would provide unsatisfactory control characteristics for a high-performance flight control actuation system.

In one attempt to overcome these problems, a servopump was assembled with a second, small auxiliary pump and a four-way "stiffness enhancement" valve to provide fluid makeup for internal leakage within the active system. The four-way valve also maintained the cylinder pressure at approximately one-half system pressure on each side of the piston at the null position. This arrangement corrected the stiffness and response deficiencies of the earlier designs. However, the heat rejection was still too high.

Efforts are currently directed toward an IAP with a servoed variable-speed reversible electric motor driving a fixed-displacement hydraulic pump. These IAPs are called electrohydrostatic actuators (EHAs). They are currently being developed as simplex units with a single linear actuator which is designed to operate with other simplex units installed in a parallel arrangement. Such arrangements are expected to be susceptible to overheating of the direct-voltage motor controller, which will affect the stiffness and response of the actuator. The questions of whether the unit can be designed for the higher force loads and still meet the performance and environment resistance requirements of military aircraft in the supersonic flight environment have not been addressed.

As useful as the IAP concept is, unacceptable overheating has generally prevented its adoption for high-power applications such as actuating primary flight control surfaces on supersonic aircraft or large surfaces on subsonic aircraft. For example, duplex IAPs were sized to provide full capability to both actuator hydraulic channels, but the heat generated by their pumps and motors was such that severe overheating resulted.

It is therefore desirable to have a hybrid control actuator system that is not susceptible to overheating even while providing full power through its electrically driven pumps. The system can be a hybrid which typically receives power from a conventional hydraulic control system as well as from an electrically-powered system.

DISCLOSURE OF THE INVENTION

It is an object of the present invention to provide an actuator system with an electric-motor-driven pump that does not overheat.

It is another object of the present invention to provide an actuator system having hydraulically- and electrically-powered actuators that individually have the capability to provide the full actuation power required.

It is yet another object of the present invention to provide an actuator system that can save power by compensating to the required load demand.

It is a still further object of the present invention to provide an actuator system that has increased reliability and survivability.

An additional object of the present invention is to provide a redundant actuator power system that has reduced weight.

In one aspect, the invention is a hydraulic fluid actuation system adapted to carry fluid pressure to each of one or more control devices in response to one or more signals produced by an actuation signal system for positioning at least one of the control devices. The hybrid fluid actuation system comprises one or more local fluid systems, each local fluid system being associated with a distinct one of the one or more control devices. Each local fluid system includes first transducer means for receiving one of the one or more signals from the fluid actuation signal system and producing a first fluid flow in response thereto. Each local fluid system also includes a second fluid system and second transducer means for receiving one of the one or more signals from the fluid actuation signal system and producing a second fluid flow in response thereto. Finally, each local fluid system includes actuation means for receiving the first and second fluid flows and producing force or torque outputs to position at least one of the control devices.

In another aspect, the invention is a method for operating a hybrid fluid actuation system, the system being adapted to carry fluid pressure to each of one or more control devices in response to one or more signals produced by a control surface actuation signal system for positioning at least one of the control devices. The method comprises the steps of (a) sending the signal to a first transducer means connected to a first fluid system of each of one or more local fluid systems, each local fluid system being associated with a distinct one of the at least one control device and (b) receiving a first fluid flow from the first transducer means of each of the local fluid systems in response to the distinct one of the one or more surface actuation signals. In addition the method comprises the steps of (c) sending the first fluid flow to distinct second transducer means connected to each of one or more second fluid systems, each second fluid system being associated with a distinct one of the local fluid systems, (d) receiving a second fluid flow from the second transducer means of each of the local fluid systems in response to the first fluid flow, and (e) sending the first and second fluid flows to an actuation means, the actuation means being adapted to continuously position the one of the at least one control devices.

BRIEF DESCRIPTION OF THE DRAWINGS

FIG. 1 is a graph comparing the power demands of a conventional servoactuator and the actuator of the present invention at typical actuator performance conditions.

FIG. 4 is a schematic diagram of a third embodiment of a hybrid integrated actuator package.

BEST MODES FOR CARRYING OUT THE INVENTION

The hybrid integrated actuator package (HIAP) concept of the present invention consists of two hydraulic actuator pistons operating in concert to position a device, such as an aircraft flight control surface, wherein one piston is powered by an electric-motor-driven hydraulic pump mounted integrally with the actuator, and the other piston is powered from a separate hydraulic pressure source such as an aircraft distributed hydraulic system. The actuator pistons can be incorporated either in two separate hydraulic actuating cylinders or in a dual-tandem arrangement. Each of the electric-motor-driven pump and control valve arrangements disclosed in this application is designed to adapt the hydraulic power generated by the pump to just meet the load imposed on the actuator. This feature is very important, as described in greater detail below.

Actuators are commonly characterized by the forces they can produce and the speeds at which they can move. For most aircraft flight control surface actuation systems, and many other applications as well, there are at least two specific load and rate (i.e., force and speed) combinations which must be satisfied. One is a maximum stall load (at zero rate) which must be resisted to hold the surface in its commanded position and prevent it from blowing back toward its faired, or neutral, position. Another is a maximum-power condition which combines a high surface rate with a hinge-moment load that is considerably smaller than the maximum stall load. A third, which is often specified for flight control servoactuators, is a maximum no-load rate.

These three requirements are shown in FIG. 1 along with a typical square-law output curve for a conventional hydraulic servoactuator. In this example of the output requirements of a typical flight control surface actuation system, it can be seen that the load at the maximum power condition is only approximately twenty percent of the required maximum stall-load capability. The magnitude of the power required at the maximum power condition is represented by the cross-hatched area at the left side of the graph.

With a true load-adaptive actuator, this area represents the power demand on the hydraulic system. However, when a conventional actuator sized by the stall-load condition is stroked at the rate required to meet the maximum-power condition, a higher power level, as represented by the large dotted area, is generated by the hydraulic system. In the case shown in FIG. 1, the power generated to serve a conventional actuator can be about five times that required for a true load-adaptive actuator. The excess power is throttled by the servoactuator and heats up the hydraulic fluid.

Figure 2:
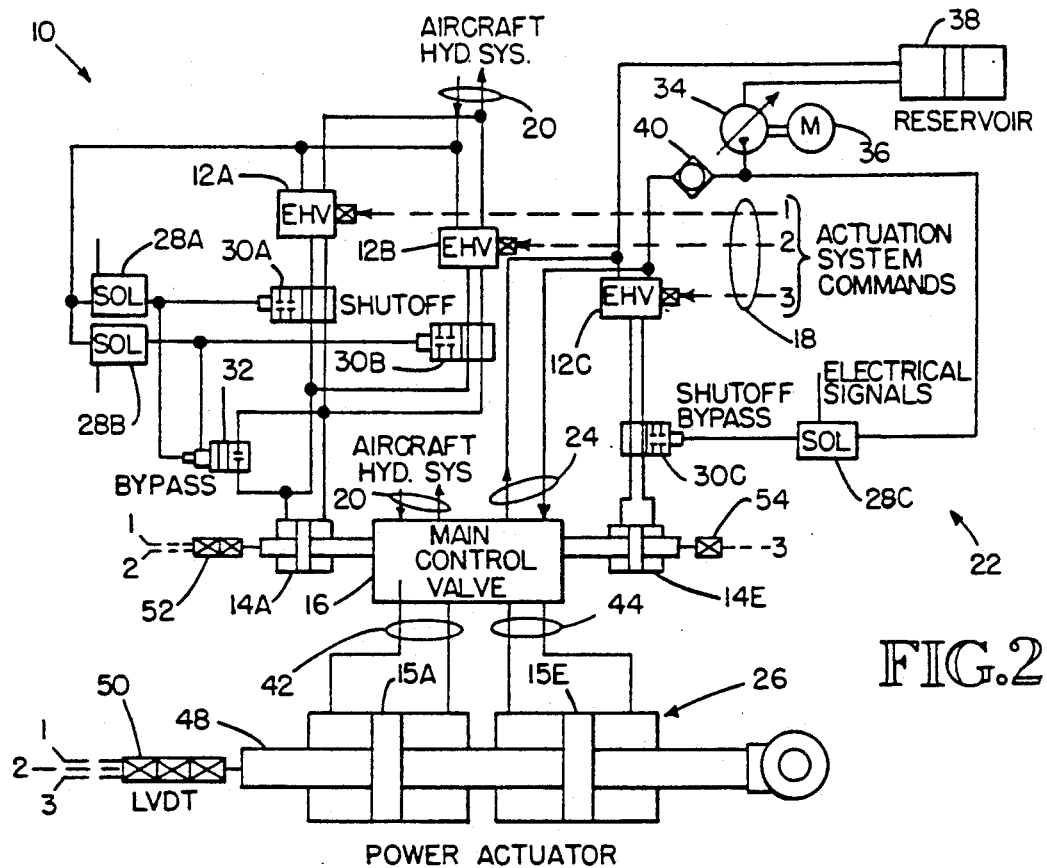
FIG. 2 is a schematic diagram of a first embodiment of a hybrid integrated actuator package.
Figure 3:
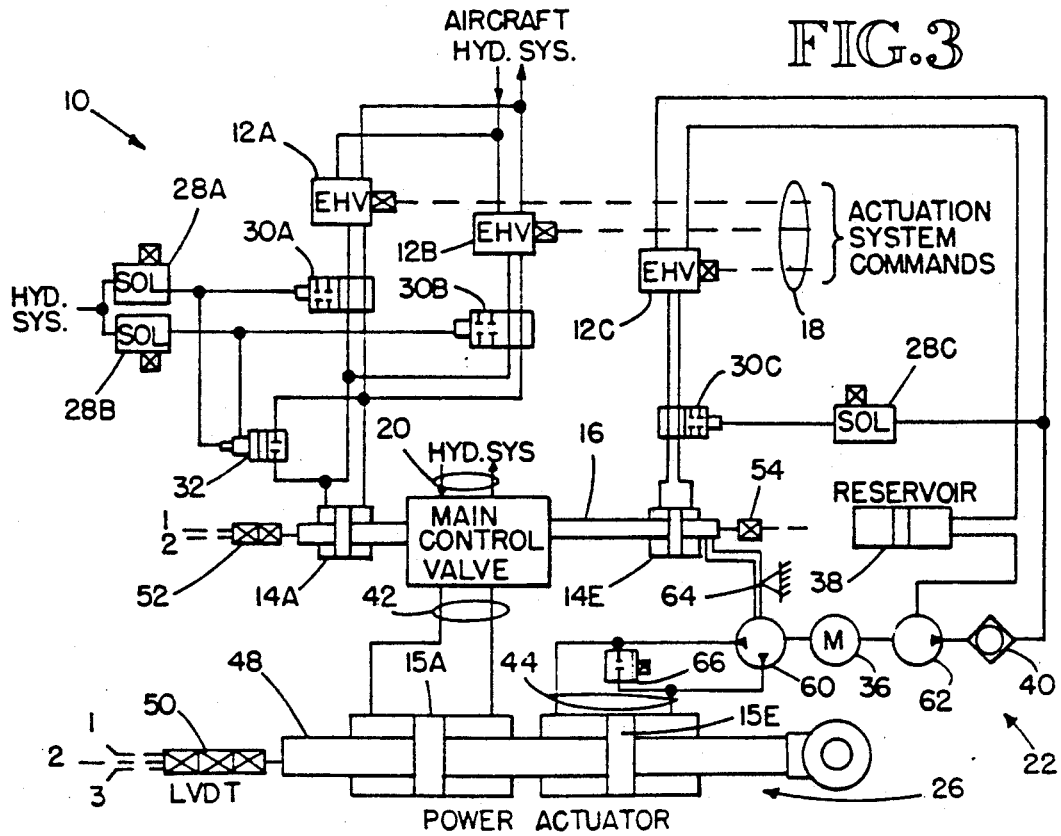
FIG. 3 is a schematic diagram of a second embodiment of a hybrid integrated actuator package.

The three HIAP configurations shown in FIGS. 2-4 are arranged to achieve load-adaptive performance for the electric-motor-driven pump-pressurized servoactuator as noted below. They all use electrohydraulic servovalves (EHVs) to gain the high performance and relative invulnerability provided by the so-called fly-by-wire control mode. However, they could also be controlled by mechanical input servovalves within the context of these inventions.

35 In the case of each embodiment of FIGS. 2-4, power to the electric-motor-driven pump is provided by a separate electric power source such as an aircraft main electric power system. The net result is a mutually-supporting arrangement which provides electric backup power to the hydraulic power system and hydraulic backup power to the electric power system. For military combat aircraft, the required number of hydraulic systems may be reduced from three to two because of the resulting increase in actuation system reliability and survivability gained from this dissimilar redundancy, and the reduction in hydraulic system vulnerability gained from the elimination of several branch lines. This would both reduce weight and support military weapon system readiness goals by reducing aircraft logistic and maintenance requirements.

There are quite a few possible control schemes which can be used for a unit of this type. Most of them utilize a hydraulic servovalve. Any of the following types of servovalves can be employed in arrangements of two or more servovalves depending upon the degree of redundancy required:

a. A mechanically-operated servovalve (through control cables or push rods).
b. A conventional two-stage electrohydraulic servovalve.
c. A single-stage (i.e., direct-drive) electrohydraulic servovalve.
d. An optical (fiberoptic signaled) servovalve.

An arrangement of three identical electrohydraulic servovalves (EHVs) is shown in the IAP configurations of FIGS. 2 and 3. These configurations provide a dual-fail operational capability. The configuration shown in FIG. 4 includes two EHVs for the actuator piston supplied by the airframe hydraulic system. The pressure and flow to the other piston are controlled by a fixed-displacement pump powered by a variable-speed reversing electric motor.

In the hybrid actuator system 10 shown in FIG. 2, the three EHVs 124A-C control two modulating (mod) pistons 14A and 14E to position the dual-tandem, main control valve 16 as in a conventional servoactuator. The mod pistons 14A and 14E are hydraulically connected to the pistons 15A and 15E in the main control valve 16 so that they move together as a unit. The EHVs 12A-C receive electrical commands from the actuation system on signal lines 18. The signals can also be transmitted mechanically to a mechanical-input servovalve. Generally, each of the lines 18 carries the same signal, but in parallel, in order to improve the redundancy of actuator system 10.

The main control valve 16 receives hydraulic power from both the aircraft hydraulic system (along hydraulic flow lines 20) and the electrically powered local hydraulic system 22 (along hydraulic flow lines 24), which is located close to the dual-tandem power actuator 26 and the control surface it actuates (not shown).

In the part of the actuator system 10 that is supplied hydraulic power by the aircraft hydraulic system, mod piston 14A receives metered hydraulic control flows from two parallel hydraulic circuits that include EHVs 12A and 12B, solenoid valves 28A and 28B, and shutoff valves 30A and 30B, respectively. The two parallel circuits are connected by bypass valve 32. The logic control circuitry responds to mechanical and hydraulic failures of the actuation system by disconnecting that portion of the hydraulic circuitry which is affected by the failure. In response to control signals to the EHVs 12A and 12B on signal lines 18, the EHVs 12A and 12B allow hydraulic pressure to pass from the aircraft hydraulic system to the mod piston 14A. The signals on signal lines 18 are derived from the pilot control signals and other sources, such as a targeting system.

In the electrically powered local system 22 of the actuator system 10, metered hydraulic control flow is passed to mod piston 14E from a variable-displacement pump 34 that is operated at constant speed by the electric motor 36. The fluid that is pumped by the pump 34 is supplied from a reservoir 38 to the EHV 12C through the filter 40 and from EHV 12C to the solenoid-operated shutoff-bypass valve 30C.

In case of loss of hydraulic pressure in any of the hydraulic systems or a mechanical failure, the solenoid 28 which is in the affected portion of the hydraulic system will actuate the corresponding shutoff-bypass valve 30. In the case of the hydraulic system which is supplied power by the aircraft hydraulic system, the bypass valve 32 will be operated in order to bypass the affected hydraulic circuit, thereby preventing hydraulic lockup of mod piston 14A.

The metered hydraulic flow supplied by the main control valve 16, along the hydraulic flow lines 42 and 44, passes to two separate sections of the dual-tandem power actuator 26. The metered flows supplied by either flow lines 42 or 44 individually are sufficiently powerful to actuate the dual-tandem actuator 26 under all expected loads. Therefore, in the case of a failure of either one or two of the hydraulic circuits in the hybrid actuator system 10, the control surface connected to the actuator 26 can still be actuated.

The piston rod 48 of the power actuator 26 is mechanically linked to the linear variable displacement transformers (LVDTs) 50. There is one LVDT for each EHV. The LVDTs 52 and 54 are attached to the mod pistons 14A and 14E, respectively, in order to insure that the power actuator 26 follows the mod pistons 14A and 14E. The signals the LVDTs 50 produce are compared to the command signals and the signals produced by the LVDTs 52 and 54 in logic circuitry (not shown) in order to properly coordinate the movements of the power actuator 26 and the main control valve 16.

In the system shown in FIG. 2, the load-adaptive power reduction is achieved through conventional compensator valves built into the constant-speed variable-displacement pump 34. The compensator valves can be controlled hydromechanically or electrically. They can, for example, have cutoff characteristics that reduce the flow through a relatively large range of discharge pressures.

Figure 5:
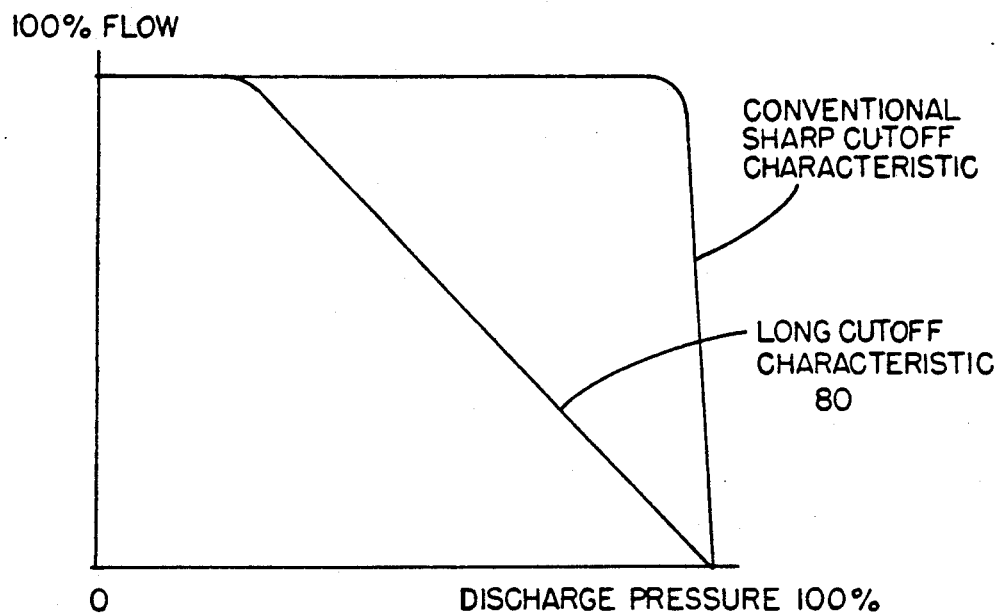
FIG. 5 is a graph showing the flow adjustments possible by a load-adaptive pump pressure compensator in use with an actuator of the present invention.

The long-cutoff compensator adjusts the flow in relation to the load pressure along a fixed curve 80 as shown in FIG. 5. This may prove entirely satisfactory for some applications; but, for others, the resulting rate-versus-load relationship may vary too widely for the fixed characteristic to be of enough value to prevent overheating.

Figure 6:
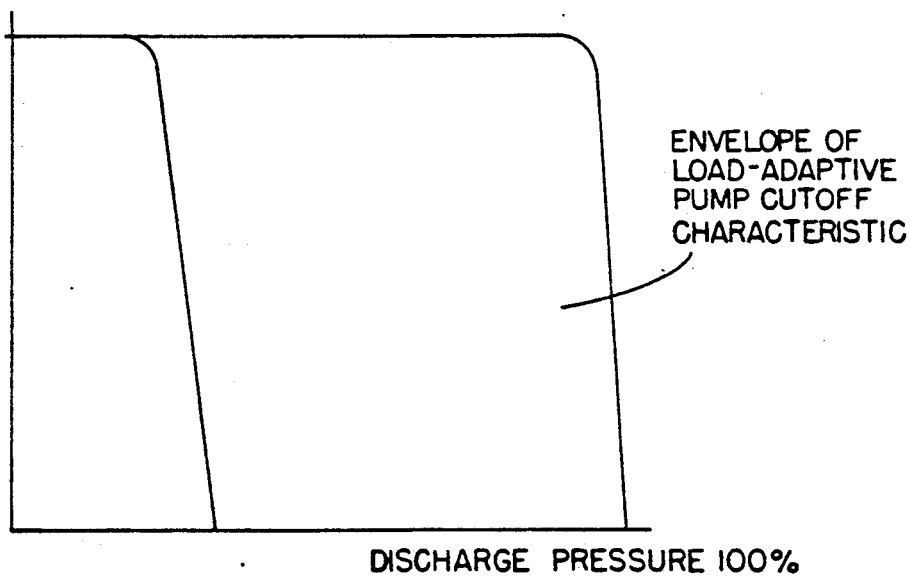
FIG. 6 is a graph showing the envelope of flows and pressures possible with an actuator of the present invention using an electrically-controlled pump pressure compensating valve.

The electrically-controlled compensating valve can be programmed to provide the most power-economical combination of pressure and flow for all phases of the required operating conditions (e g., flight envelope), thereby substantially reducing the heat generated and obviating overheating problems of the prior art. All combinations of high to low flow and high to low pressure in an envelope such as shown in FIG. 6 can be provided. Such pumps are currently being developed by the Abex Corporation, Aerospace Division in Oxnard, Calif. and by Vickers, Inc. in Jackson, Miss.

The servopump hybrid actuator system 10 shown in FIG. 3 operates in a very similar fashion to that shown in FIG. 2. The aircraft hydraulic system and the electrically-powered local hydraulic system supply parallel hydraulic flow circuits which are connected to the main control valve 16 in the manner described in connection with FIG. 2. The hydraulic flow lines 42 carry metered hydraulic power flow from the main control valve 16 to one part of the dual-tandem power actuator 26, as described above. However, the hydraulic power supplied by the electrically-powered hydraulic circuit is supplied directly to the dual-tandem power actuator 26. The electrically-powered hydraulic circuit includes a motor 36 which powers both a conventional integrally-mounted servopump 60 and a small auxiliary pump 62. The motion of the mod piston 14E is passed to a stroking piston displacement control on the servopump 60 through mechanical linkage 64.

The displacement control affects both the amount of displacement of the pump and the direction of the displacement. Accordingly, the power actuator 26 can be caused to move in accordance with the metered hydraulic power flow supplied by the electrically-powered circuit 22 through the hydraulic flow lines 44. The control is designed so that the displacement of the servopump 60 is varied to just meet the output pressure and rate requirements of the actuator control system 10. This minimizes the amount of excess heat generated by the motor and pump and thereby overcomes the heating problems encountered in the prior art.

When the electrically-powered hydraulic circuit 22 experiences a failure, the bypass valve 66 is operated so that the portion of the dual-tandem power actuator 26 that is connected to the electrically-powered hydraulic circuit 22 does not block or operate against the other hydraulic circuits that are still functioning.

The servomotor hybrid actuation system 10 shown in FIG. 4 is yet another embodiment of the invention. In this case, however, the hydraulic flow supplied by the electrically-powered hydraulic system 22 is not controlled by a mod piston. In the system of FIG. 4, the hydraulic flow power is supplied by a fixed-displacement pump 70 which is powered by a variable-speed reversing motor 72. As shown in the embodiments of FIGS. 2 and 3, the motor and pump of the embodiment of FIG. 4 can also be operated to just meet the instantaneous load requirements, thereby minimizing the amount of excess heat they generate.

While the foregoing discussion has covered only three basic embodiments of the present invention, one skilled in the art will readily appreciate that various modifications of the above-described embodiments may be made without departing from the spirit and the scope of the invention. Accordingly, the spirit and the scope of the present invention are to be limited only by the following claims.

I claim:

1. A hybrid control surface actuation system for a craft operating in a fluid, the craft having one or more fluid-dynamic control surfaces, a first hydraulic system adapted to produce and carry hydraulic pressure to each of the control surfaces, and a control surface actuation signal system adapted to produce a signal for controlling at least one of the control surfaces, comprising:

one or more local hydraulic systems, each local hydraulic system being associated with a distinct one of the one or more fluid-dynamic control surfaces and including:

first transducer means connected to the first hydraulic system and adapted to receive the signal from the actuation signal system and produce a first hydraulic flow signal in response thereto;

a separate second hydraulic system solely associated with that local hydraulic system for producing and carrying hydraulic pressure to the distinct one of the one or more fluid-dynamic control surfaces;

a second transducer means connected to the separate second hydraulic system and adapted to receive the signal from the actuation signal system and produce a second hydraulic flow signal in response thereto; and actuation means for receiving the first and second hydraulic flow signals, the actuation means being adapted to continuously actuate the distinct one of the control surfaces of the craft in response to at least one of the first and second hydraulic flow signals.

2. The hybrid actuation system of claim 1 wherein the actuation means comprises a hydraulic actuator attached to the distinct one of the control surfaces.

3. A hybrid control surface actuation system for a craft operating in a fluid, the craft having one or more fluid-dynamic control surfaces, a first hydraulic system adapted to produce and carry hydraulic pressure to each of the control surfaces, and an electrical control surface actuation signal system adapted to produce an electrical signal for controlling at least one of the control surfaces, comprising:

one or more local hydraulic systems, each local hydraulic system being associated with a distinct one of the one or more fluid-dynamic control surfaces and including:

first transducer means connected to the first hydraulic system and adapted to receive the electrical signal from the electrical control surface actuation signal system and produce a first hydraulic flow signal in response thereto;

a separate second hydraulic system solely associated with that local hydraulic system for producing and carrying hydraulic pressure to the distinct one of the one or more fluid-dynamic control surfaces;

second transducer means connected to the separate second hydraulic system and adapted to receive the electrical signal from the electrical control surface actuation signal system and produce a second hydraulic flow signal in response thereto; and actuation means for receiving the first and second hydraulic flow signals, the actuation means being adapted to continuously actuate the distinct one of the control surfaces of the craft in response to at least one of the first and second hydraulic flow signals.

4. The hybrid actuation system of claim 3 wherein the actuation means comprises means for receiving the first and second hydraulic flow signals and producing first and second hydraulic actuation signals in response thereto, the first and second hydraulic actuation signals causing an actuator to actuate the distinct one of the control surfaces of the craft.

5. The hybrid actuation system of claim 4 wherein the means for receiving the first and second hydraulic flow signals comprises a main control valve comprising two modulating pistons, each of the modulating pistons receiving a distinct one of the first and second hydraulic flow signals.

6. The hybrid actuation system of claim 5 wherein the main control valve produces the first hydraulic actuation signal in response to the first hydraulic flow signal.

7. The hybrid actuation system of claim 6 wherein the means for receiving the first and second hydraulic flow signals further comprises a servopump connected to one of the modulating pistons and an electric motor for operating the servopump, the servopump producing the second hydraulic actuation signal.

8. The hybrid actuation system of claim 7 wherein the actuation means comprises a dual tandem hydraulic actuator having two subactuators, one of the two subactuators being responsive to the first hydraulic modulating signal and the other of the two subactuators being responsive to the second hydraulic modulating signal.

9. A hybrid control surface actuation system for a craft operating in a fluid, the craft having one or more fluid-dynamic control surfaces, a first hydraulic system adapted to produce and carry hydraulic pressure to each of the control surfaces, and an electrical control surface actuation signal system adapted to produce an electrical signal for controlling at least one of the control surfaces, comprising:

one or more local hydraulic systems, each local hydraulic system being associated with a distinct one of the one or more fluid-dynamic control surfaces and including:

a first hydraulic circuit connected to the first hydraulic system and including a first electrohydraulic servo valve adapted to receive the electrical signal, to control the hydraulic pressure from the first hydraulic system, and to produce a first hydraulic modulating signal in response to the electrical signal;

a separate second hydraulic circuit solely associated with that local hydraulic system for producing and carrying hydraulic pressure to the distinct one of the one or more fluid-dynamic control surfaces, the second hydraulic circuit comprising an electrical motor, a pump connected to the motor, and a second electrohydraulic servo valve adapted to receive the electrical signal and to produce a second hydraulic modulating signal; and actuation means adapted to receive the first and second modulating signals and produce a first hydraulic actuation signal, the actuation means being adapted to continuously actuate the distinct one of the control surfaces of the craft in response to at least one of the first and second hydraulic modulating signals.

10. The hybrid actuation system of claim 9 wherein the actuation means comprises a main control valve having two modulating pistons, each of the modulating pistons receiving a distinct one of the first and second hydraulic modulating signals.

11. The hybrid actuation system of claim 10 wherein the actuation means further comprising means for producing a second hydraulic actuation signal and a dual tandem hydraulic actuator having two subactuators, one of the two subactuators being responsive to the first hydraulic modulating signal and the other of the two subactuators being responsive to the second hydraulic modulating signal.

12. A method for controlling a craft operating in a fluid, the craft having one or more fluid-dynamic control surfaces, a first hydraulic system adapted to produce and carry hydraulic pressure to each of the control surfaces, and a control surface actuation signal system adapted to produce a signal for controlling at least one of the control surfaces, the method comprising the steps of:

(a) sending the signal to a first transducer means connected to the first hydraulic system of each of one or more local hydraulic systems, each local hydraulic system being associated with a distinct one of the one or more fluid-dynamic control surfaces;

(b) receiving a first hydraulic flow signal from the first transducer means of each of the local hydraulic systems in response to the signal;

(c) sending the signal to distinct second transducer means connected to each of one or more second hydraulic systems, each second hydraulic system being solely associated with a distinct one of the local hydraulic systems for producing and carrying hydraulic pressure to the distinct one of the one or more fluid-dynamic control surfaces;

(d) receiving a second hydraulic flow signal from the second transducer means of each of the local hydraulic systems in response to the signal; and (e) sending the first and second hydraulic flow signals to an actuation means, the actuation means being adapted to continuously actuate the one of the at least one control surface of the craft in response to the first and second hydraulic flow signals.

13. A method for controlling a craft operating in a fluid, the craft having one or more fluid-dynamic control surfaces, a first hydraulic system adapted to produce and carry hydraulic pressure to each of the control surfaces, and an electrical control surface actuation signal system adapted to produce an electrical signal for controlling at least one of the control surfaces, the method comprising the steps of:
(a) controlling the hydraulic pressure from the first hydraulic system to a first hydraulic circuit of a local hydraulic system, by sending the electrical signal to a first electrohydraulic servo valve in the first hydraulic circuit;
(b) producing a first hydraulic modulating signal in the first hydraulic circuit in response to the electrical signal;
(c) sending the electrical signal to a second hydraulic circuit of the local hydraulic system, the second hydraulic circuit being solely associated with a distinct one of the local hydraulic systems for producing and carrying hydraulic pressure to the distinct one of the one or more fluid-dynamic control surfaces and comprising an electrical motor, a pump connected to the motor, and a second electrohydraulic servo valve adapted to receive the electrical signal;
(d) producing a second hydraulic modulating signal in the second hydraulic circuit in response to the electrical signal; and
(e) receiving the first and second modulating signals and producing a first hydraulic actuation signal in response thereto, thereby continuously actuating the distinct one of the control surfaces of the craft in response to at least one of the first and second hydraulic modulating signals.

* * * * *